No. 852,432. PATENTED MAY 7, 1907.
B. O. GUDGEN.
CARPENTER'S GAGE.
APPLICATION FILED JUNE 28, 1906.
Fig. 1
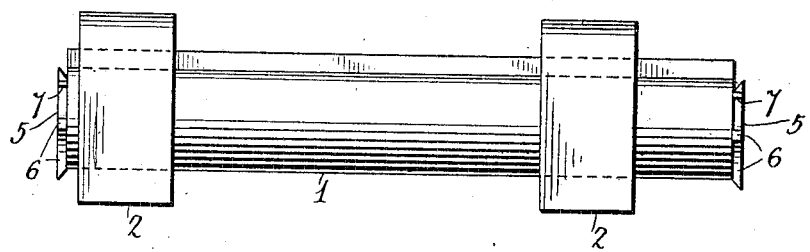
Fig. 2 Fig. 3
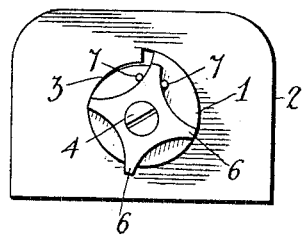 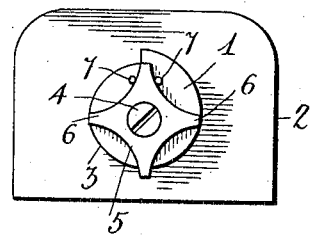
Witnesses
J. Jenkins
L. O. Hilton
Inventor
B. O. Gudgeon
by H. B. Willson & Co
Attorneys

# UNITED STATES PATENT OFFICE.

BENJAMIN O. GUDGEN, OF PITTSBURG, KANSAS.

CARPENTER'S GAGE.

No. 852,432.     Specification of Letters Patent.     Patented May 7, 1907.

Application filed June 28, 1906. Serial No. 323,812.

*To all whom it may concern:*

Be it known that I, BENJAMIN O. GUDGEN, a citizen of the United States, residing at Pittsburg, in the county of Crawford and State of Kansas, have invented certain new and useful Improvements in Carpenters' Gages; and I do declare the following to be a full, clear, and exact description of the invention, such as will enable others skilled in the art to which it appertains to make and use the same.

This invention relates to improvements in carpenters' gages.

The object of the invention is to provide a carpenter's gage having means whereby the head or sliding block may be secured at any desired point on the shank without the use of a set screw or separate fastening mechanism.

A further object is to provide a gage having on one or both ends of its shank a movable marking wheel constructed with a plurality of marking or scratching points.

With the above and other objects in view, the invention consists of certain novel features of construction, combination and arrangement of parts, as will be hereinafter described and claimed.

In the accompanying drawings:—Figure 1 is a side view of a gage constructed in accordance with the invention; Fig. 2 is an end elevation of the same, showing the block or head in locked position; Fig. 3 is a sectional view through the shank, showing the block in a released position;

Referring more particularly to the drawings, 1 denotes the shank of the gage, said shank being cam-shaped in cross section, and adapted to receive one or more slidably mounted heads or blocks 2, said heads or blocks being of any suitable shape and provided with a passage 3, which is also cam-shaped to correspond with the shape of the shank. The hole or aperture 3 in the blocks 2 is of slightly greater extent or size than the shank 1, so that said blocks are permitted to be slightly turned in one direction or the other, the turning of the same in one direction releasing the walls of the aperture 3 from frictional engagement with the sides of the same, while a slight turn in the opposite direction causes the wall of the blocks to tightly engage or bind upon the sides of the shank, thus holding or locking said blocks in any position along the shank to which the same may be adjusted.

On one or both ends of the shank is removably secured by means of a screw or other fastening device 4, a marking element 5. This marking element is provided with a plurality of radially disposed arms 6, the outer ends of which are sharpened or beveled to form marking or scratching points. In the end of the shank near the upper side thereof is arranged two pins 7, between which the uppermost arm 6 of the marking element is adapted to be arranged, so that when the screw or other fastening device 4 is tightened in the end of the shank, the marking element 5 will be held against rotation with the scratching point of one of its arms projecting below the lower side of the shank, as shown.

By providing a gage having a cam-shaped shank and a head having a similarly-shaped passage, said head may be quickly tightened or released from engagement with the shank, thus facilitating the adjustment of the block and dispensing with the usual set screw for holding said head in place. By providing a marking element having a plurality of scratching points which may be successively brought into an operative position, the gage may be kept in working order as a sharp scratching edge or point may be quickly turned into opative position to take the place of one that has been dulled.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined by the appended claims.

Having thus described my invention, what I claim as new and desire to secure by Letters-Patent, is:—

A gage of the character described comprising a shank, cam-shaped in cross section, a head slidably mounted thereon, said head having a cam-shaped opening to engage the cam-surface of said shank, whereby said block is locked into or released from engagement with the shank, a movable marking element pivotally mounted on the outer end of said shank, and having a series of radially disposed arms, said arms having on their outer ends marking or scratching edges, and stop pins projecting from the end of said shank, whereby said marking element is held against rotation with one of said marking arms in an operative position, substantially as described.

In testimony whereof I have hereunto set my hand in presence of two subscribing witnesses.

BENJAMIN O. GUDGEN.

Witnesses:
A. H. GREEF,
C. E. CUMMINGS.